United States Patent
Moyer et al.

(10) Patent No.: US 12,316,765 B2
(45) Date of Patent: May 27, 2025

(54) UNTRUSTED MULTI-PARTY COMPUTE SYSTEM

(71) Applicant: Google LLC, Mountain View, CA (US)

(72) Inventors: Keith Moyer, Kirkland, WA (US); Alex Wu, Seattle, WA (US); Jiankun Lu, Mountain View, CA (US); Joseph Richey, Mountain View, CA (US); Catalin Daniel Sandu, Kirkland, WA (US)

(73) Assignee: Google LLC, Mountain View, CA (US)

( * ) Notice: Subject to any disclaimer, the term of this patent is extended or adjusted under 35 U.S.C. 154(b) by 217 days.

(21) Appl. No.: 18/314,933

(22) Filed: May 10, 2023

(65) Prior Publication Data

US 2024/0380595 A1 Nov. 14, 2024

(51) Int. Cl.
H04L 9/30 (2006.01)
H04L 9/08 (2006.01)
H04L 9/32 (2006.01)
H04L 9/40 (2022.01)

(52) U.S. Cl.
CPC .......... H04L 9/3213 (2013.01); H04L 9/0819 (2013.01); H04L 63/102 (2013.01); *H04L 2209/46* (2013.01)

(58) Field of Classification Search
CPC ..................................................... H04L 9/3213
See application file for complete search history.

(56) References Cited

U.S. PATENT DOCUMENTS

| | | | | |
|---|---|---|---|---|
| 7,359,881 | B2 * | 4/2008 | Stefik | H04L 63/123 |
| | | | | 375/E7.009 |
| 11,539,685 | B2 * | 12/2022 | Simic | H04L 9/3263 |
| 11,870,816 | B1 * | 1/2024 | Roth | G06F 21/33 |
| 2017/0257352 | A1 * | 9/2017 | Revell | H04L 9/0822 |
| 2019/0372956 | A1 * | 12/2019 | Breu | H04L 9/0861 |
| 2024/0380595 | A1 * | 11/2024 | Moyer | H04L 63/102 |

* cited by examiner

*Primary Examiner* — Ponnoreay Pich
(74) *Attorney, Agent, or Firm* — Honigman LLP; Brett A. Krueger

(57) ABSTRACT

A method includes obtaining a container associated with a first entity, the container executing a workload, the workload requiring access to private resources associated with a second entity. The method also includes obtaining encrypted resources including the private resources associated with the second entity. The method further includes generating a verifiable attestation. The method includes transmitting the verifiable attestation to an attestation service and, after transmitting the verifiable attestation, receiving, from an access policy verifier, a federated identity token. The method further includes generating a decrypt request including the federated identity token. The method includes transmitting, to a key management service, the decrypt request, and, after transmitting the decrypt request, receiving, from the key management service, a data encryption key. The method includes decrypting, using the data encryption key, the encrypted resources to access the private resources and providing the workload access to the private resources.

20 Claims, 7 Drawing Sheets

UNTRUSTED MULTI-PARTY COMPUTE SYSTEM

TECHNICAL FIELD

This disclosure relates to cloud-based resources sharing in an untrusted multi-party compute system.

BACKGROUND

Data analytics is a valuable tool for organizations to gain insights on available information. To increase the size of available data, organizations can share datasets. While sharing datasets can be valuable for all of the organizations involved, sharing data is not a straightforward endeavor. In particular, an organization can have sensitive/private data that cannot be shared with other parties.

SUMMARY

One aspect of the disclosure provides a method for cloud-based resources sharing in an untrusted multi-party compute system. The computer-implemented method when executed on data processing hardware of a trusted execution environment (TEE) causes the data processing hardware to perform operations including obtaining a container associated with a first entity, the container executing a workload, the workload requiring access to private resources associated with a second entity. The operations also include obtaining encrypted resources including the private resources associated with the second entity. The operations further include generating a verifiable attestation indicating an integrity of the workload and the container. The operations include transmitting the verifiable attestation to an attestation service and, after transmitting the verifiable attestation, receiving, from an access policy verifier, a federated identity token indicating that the verifiable attestation satisfies an attribute condition provided by the second entity. The operations further include generating a decrypt request including the federated identity token. The operations include transmitting, to a key management service, the decrypt request, and, after transmitting the decrypt request, receiving, from the key management service, a data encryption key indicating that the federated identity token satisfies a security policy provided by the second entity. The operations include decrypting, using the data encryption key, the encrypted resources to access the private resources. The operations further include providing the workload access to the private resources associated with the second entity.

Implementations of the disclosure may include one or more of the following optional features. In some implementations, obtaining the encrypted resources includes receiving the encrypted resources from a cloud database. In some implementations, the operations include, after transmitting the verifiable attestation, receiving, from the attestation service, an identification token generated based on the verifiable attestation. In these implementations, the operations further include transmitting, to the access policy verifier, the identification token. In these implementations, the operations include, after transmitting the identification token, receiving, from the access policy verifier, the federated identity token.

In some implementations, transmitting the decrypt request causes the key management service to determine that, based on the federated identity token satisfying the security policy provided by the second entity, the workload is allowed to access the private resources associated with the second entity. In these implementations, transmitting the decrypt request further causes the key management service to unwrap the data encryption key and transmit the unwrapped data encryption key.

In some implementations, the operations include generating a workload image corresponding to the workload. In these implementations, the operations include transmitting, to an auditor, the workload image, wherein receiving the workload image causes the auditor to validate the workload image and publish the validated workload image to the first entity and the second entity.

In some implementations, the operations further include disabling features of the container based on preferences of the second party. In these implementations, the features may include one or more of container data, container packages, and container binaries. The verifiable attestation may be based on a hardened launcher image corresponding to the container. The operations may further include executing the workload using the private resources associated with the second entity. Further, the decrypt request may be an API call.

Another aspect of the disclosure provides a system for cloud-based resources sharing in an untrusted multi-party compute system. The system includes data processing hardware of a trusted execution environment (TEE) and memory hardware in communication with the data processing hardware. The memory hardware stores instructions that when executed on the data processing hardware cause the data processing hardware to perform operations. The operations include obtaining a container associated with a first entity, the container executing a workload, the workload requiring access to private resources associated with a second entity. The operations also include obtaining encrypted resources including the private resources associated with the second entity. The operations further include generating a verifiable attestation indicating an integrity of the workload and the container. The operations include transmitting the verifiable attestation to an attestation service and, after transmitting the verifiable attestation, receiving, from an access policy verifier, a federated identity token indicating that the verifiable attestation satisfies an attribute condition provided by the second entity. The operations further include generating a decrypt request including the federated identity token. The operations include transmitting, to a key management service, the decrypt request, and, after transmitting the decrypt request, receiving, from the key management service, a data encryption key indicating that the federated identity token satisfies a security policy provided by the second entity. The operations include decrypting, using the data encryption key, the encrypted resources to access the private resources. The operations further include providing the workload access to the private resources associated with the second entity.

This aspect may include one or more of the following optional features. In some implementations, obtaining the encrypted resources includes receiving the encrypted resources from a cloud database. In some implementations, the operations include, after transmitting the verifiable attestation, receiving, from the attestation service, an identification token generated based on the verifiable attestation. In these implementations, the operations further include transmitting, to the access policy verifier, the identification token. In these implementations, the operations include, after transmitting the identification token, receiving, from the access policy verifier, the federated identity token.

In some implementations, transmitting the decrypt request causes the key management service to determine that, based on the federated identity token satisfying the security policy provided by the second entity, the workload is allowed to access the private resources associated with the second entity. In these implementations, transmitting the decrypt request further causes the key management service to unwrap the data encryption key and transmit the unwrapped data encryption key.

In some implementations, the operations include generating a workload image corresponding to the workload. In these implementations, the operations include transmitting, to an auditor, the workload image, wherein receiving the workload image causes the auditor to validate the workload image and publish the validated workload image to the first entity and the second entity.

In some implementations, the operations further include disabling features of the container based on preferences of the second party. In these implementations, the features may include one or more of container data, container packages, and container binaries. The verifiable attestation may be based on a hardened launcher image corresponding to the container. The operations may further include executing the workload using the private resources associated with the second entity. Further, the decrypt request may be an API call.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

With advances in data analytics and big data, it has become increasingly advantageous to collect and/or obtain large data sets to improve data analytic results. An organization can easily increase available data by running analytics on joint datasets with other parties. However, sharing resources can be challenging when certain data and/or resources must be kept private (e.g., due to compliance or privacy concerns). For example, medical researchers may wish to track clinical trials across healthcare providers while keeping patient data private. In another example, financial institutions may wish to collaborate with each other to identify fraud, while keeping customer identities private. Existing solutions for sharing resources, such as data, range from trusting the collaborating party with access to raw data, sharing filtered, masked or anonymized data, or delegating analytics to a trusted third party. These solutions are sub-optimal as they make trust implicit or, in the case of masked data, impact the quality of the results.

Implementations herein are directed to cloud-based resource sharing in an untrusted multi-party compute system. In particular, the current disclosure provides a trusted execution environment (TEE) that is designed to release private resources only to authorized workloads, and only when the authorized workloads are running in the TEE with an authorized configuration. The TEE ensures that private resources are only visible to authorized workloads and the original owners of the data. The TEE may be configured to obtain, encrypt, and store private resources. As used herein, resources refer to any data, application, code, deployments, sets, jobs, controls, etc. that can be used during the execution of the workload. The TEE may also obtain a container including a workload, generate one or more verifiable attestations indicating an integrity of the container and/or workload. In some implementations, the TEE implements the one or more verifiable attestations to obtain an identity token and/or a federated identity token. The workload running in the TEE may then, using the identity token and/or federated identity token, obtain a data encryption key for decrypting private resources for the workload.

Figure 1:
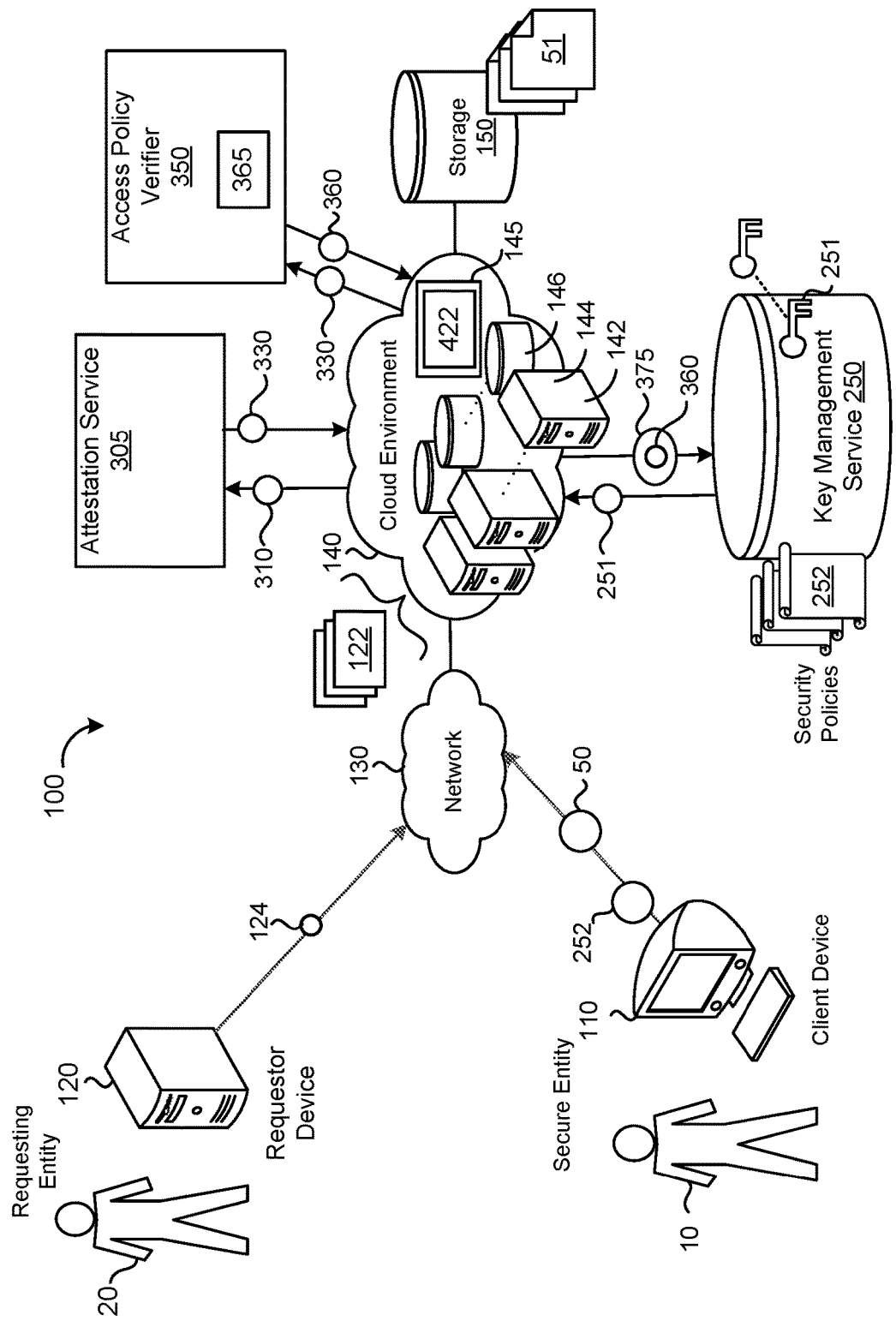
FIG. 1 is a schematic view of an example system for cloud-based resources sharing in an untrusted multi-party compute system.

Referring to FIG. 1, in some implementations, a cloud-based resources sharing system 100 includes a client device 110 associated with a secure entity 10, who may communicate, via a network 130 (e.g., a local area network (LAN), a wide area network (WAN), and/or the internet), with a remote system (i.e., cloud environment 140). The system 100 also includes a requestor devices 120 associated with a requesting entity 20, who may communicate, via the same network 130 or a different network, with the cloud environment 140. The cloud environment 140 may be a distributed system having scalable/elastic resources 142. The resources 142 include computing resources 144 (e.g., data processing hardware) and/or storage resources 146 (e.g., memory hardware such as volatile and/or non-volatile addressable semi-conductor memory). A cloud database 150 (e.g., key/value store, file system, data store, etc.) may be overlain on the storage resources 146 to allow scalable use of the storage resources 148 for storing encrypted resources 51 (including the private resources 50) associated with the secure entity 10 (e.g., the customer or client that owns the private resources 50). In some implementations, the cloud environment 140 executes a trusted execution environment (TEE) 145 that manages access to the private resources 50 (e.g., stored as encrypted resources 51 at the cloud database 150) for one or more workloads 124 (in respective containers 122) executing at TEE 145. For instance, the client device 110 may transmit the private resources 50 to the cloud environment 140 (or indicates where the cloud environment 140 may retrieve the private resources 50) while the requestor device transmits the workload 124 (or indicates where the cloud environment 140 may retrieve the workload 124) and/or container parameters defining the container 122 for the workload 124 to execute within. The containers 122 represent packages of software that include required to execute in different environments to provide a virtualized operating system and/or application (e.g., the workload 124). Here, the trusted execution environment 145 executes the workload 124 using the private resources 50 when the workload 124 is authorized, as described in greater details below.

The cloud environment 140 is configured to provide cloud-based resources sharing in an untrusted multi-party compute system. The cloud environment 140 may allow entities 10, 20 to store private resources 50 on the cloud database 150 and/or execute software services (e.g., the container 122 and/or the workload 124) on the resources 142 and/or TEE 145 for the entities 10, 20. Generally, the cloud environment 140, via the trusted execution environment 145, is responsible for keeping the private resources 50 available and accessible to authorized workloads 124, and executing the authorized workload 124 using the private resources 50. As such, entities 10, 20 may include individuals or entities (e.g., organizations) that buy or lease storage capacity and/or computing resources from the cloud environment 140 to store and/or execute private resources 50/workloads 124 associated with the individual user or entity. While the example shown depicts the secure entity 10 providing the private resources 50 and the requesting entity 20 providing the workload 124 requiring access to the private resources 50, in practice either entity can provide the private resources 50 and/or provide a workload 124 to execute within the TEE 145. Further, any number of additional entities may access the cloud environment 140 to provide the private resources 50 and/or execute a workload 124 requiring the private resources 50. In turn, the cloud environment 140, via the trusted execution environment 145, allows ingestion of the private resources 50 by authorized workload 124, without requiring that the entity associated with the workload 124 trust by the entity associated with the private resources 50.

The client device 110 and the requestor device 120 can be any computing devices that are capable of communicating with the cloud environment 140 through the network 130. The client and requestor devices 110, 120, respectively, include, but are not limited to, desktop computing devices and mobile computing devices, such as laptops, tablets, smart phones, smart speakers/displays/appliances, and wearable computing devices (e.g., headsets and/or watches). The requestor device 120 may correspond to a requesting entity 20 that may include an entity with access to the cloud environment 140 (e.g., an organization that has access to the to cloud-based resources sharing in an untrusted multi-party compute system), a third party user/entity such as law enforcement or government agency, or one or more software applications requiring access to the private resources 50 stored on the cloud database 150.

The secure entity 10 stores the private resources 50 (e.g., via the client device 110) at the cloud database 150. The trusted execution environment 145 may provide virtual machines and/or containers 122 for executing software applications deployed by the secure entity 10 or requesting entity 20 in the trusted execution environment 145. In some scenarios, the private resources 50 include any resources (e.g., source code, instructions, program state information, data, etc.) used by virtual machines and/or containers 122 deployed for use by the secure entity 10 and/or requesting entity 20. The TEE 145 may include an Enterprise Container Platform. Configuring the Enterprise Container Platform may include copying the private resources 50 into containerized applications (e.g., workloads 124).

The private resources 50 stored as encrypted resources 51 on the cloud database 150 may be sensitive/private/confidential in nature and may be modified, updated, or may otherwise change over time. For example, the private resources 50 may include business transaction information that updates after each transaction, health care information, applications, regulated data, or any other private resources 50 that can be used by a workload 124.

In the example shown, the trusted execution environment 145 encrypts the private resources 50 using a data encryption key (DEK) 251 and stores the encrypted resources 51 on the cloud database 150. In some implementations, the secure entity 10 encrypts the private resources 50 locally on the client device 110 using the DEK 251 and transmits the encrypted resources 51 to the cloud environment 140. Additionally, the secure entity 10 may define one or more security policies 252 associated with the private resources 50 stored on the cloud database 150. For instance, the secure entity 10, via the client device 110, provides an Identity and Access Management (IAM) policy to the trusted execution environment 145, whereby the IAM policy defines the security policy 252 indicating "who can do what to which thing" in which "who" is defined by federated identity tokens 360 identifying specific users/entities/applications, and "which thing" identifies workloads 124 requiring/requesting the private resources 50. Security policies 252 associated with the private resources 50 stored on the cloud database 150 may include, without limitation, individual identifiers, group identifiers, service identifiers, access roles, and/or domain addresses for software applications. Further, the security policies 252 may indicate information about workloads 124 that are authorized to access the private resources 50.

Further, a requestor device 120 may transmit a workload 124 (and any information defining the container 122 for the workload 124 to execute within) to the cloud environment 140. The workload 124 may, based on the preferences of the requesting entity 20 and/or the secure entity 10, execute using the private resources 50 stored on the cloud database 150. Upon receiving the workload 124, the trusted execution environment 145 may initiate a resource consumption process to gain access to the private resources 50. In some implementations, the trusted execution environment 145 generates one or more verifiable attestations 310 indicating an integrity of the workload 124 and/or container 122. In some implementations, the integrity of the workload 124 corresponds to any measurable and/or verifiable component of the workload 124 and/or the container 122 that can be used to assess the trustworthiness of the workload 124 and/or the container 122. For example, the integrity of the workload 124 can refer to aspects of the workload 124 and/or container such as a configuration, an operating system, one or more functions, one or more lines of code, one or more processes, one or more debuggers, inputs, outputs, an environment, an associated user/entity, a version, a system state, etc. In some implementations, the verifiable attestation 310 includes one or more compute hashes of executable code, configuration data, and other system state information of the workload 124 and/or container 122 which can be used to measure the integrity of the workload 124 and/or container 122.

The trusted execution environment 145 may generate or retrieve a launcher image 422 corresponding to the container 122 and generate the verifiable attestations 310 based on the launcher image 422. The launcher image 422 indicates the execution environment within the TEE 145. In some implementations, the launcher image 422 is a hardened launcher image 422 that indicates that the container 122 and workload 124 are immutable as the execution environment of the TEE 145 is secure. By generating the hardened launcher image 422, the trusted execution environment 145 assures that the operator (e.g., the requesting entity 20) launching the workload 124 cannot influence execution of the workload 124 beyond availability (e.g., how many instances are created and when they are allowed to run), which image of the container 122 is chosen, and the initial runtime configuration of the container 122. Accordingly, the launcher image 422 provides the operator-isolation required to make claims (i.e., attestations 310) about the workload 124 being executed and/or the container 122. The verifiable attestations 310 may thus be used to prove that the workload 124 is running approved code in an acceptable/approved environment.

The trusted execution environment 145 may transmit the verifiable attestation 310 to an attestation service 305. The attestation service 305 acts as a workload identity provider in order to translate the verifiable attestations 310 into a form that the trusted execution environment 145 may present to an access policy verifier 350 for evaluation. In some implementations, the attestation service 305 will accept verifiable attestations 310 and, after validating them, produce an identity token 330. The identity token 330 may include claims defining the workload 124 and/or the container 122 derived from the verifiable attestation 310. The claims may be as granular as necessary for the TEE 145, and may include any information that can be determined based on the verifiable attestations 310. The attestation service 305 can generate the identity token 330 to include various measurements of the container 122 and/or the workload 124. Alternatively, the attestation service 305 may check the verifiable attestations 310 against a list of known-good values and produce the identity token 330 including a claim that represents an entire environment (e.g., a particular version of the container 122). The attestation service may not require configuration by a user. Accordingly, the requesting entity 20 does not need to ensure that the container 122 and/or the workload 124 adheres to a specific configuration and can use any container 122 and/or any workload 124 that is suitable for the needs of the requesting entity 20.

After receiving the identity token 330, the trusted execution environment 145 may transmit the identity token 330 to the access policy verifier 350. The access policy verifier 350 may include attribute conditions 365 that can be used to evaluate the claims of the identity token 330. In some implementations, the attribute conditions 365 are API attribute expressions. The attribute conditions 365 may be configured by a user (e.g., the secure entity 10) or configured based on approved workload images 432 (see FIG. 4). The attribute conditions 365 may include one or more properties that can be used to evaluate the claims of the identity token 330 such as a launcher image digest, virtual machine (VM) confidentiality, and/or any information on the launcher image 422 used to generate the verifiable attestations 310. When the access policy verifier 350 determines that the claims of the identity token 330 satisfy the attribute conditions 365, the access policy verifier 350 transmits a federated identity 360 token to the trusted execution environment 145.

The trusted execution environment 145 may use the federated identity token 360 to generate a decrypt request 375 requesting a data encryption key 251. In some implementations, the decrypt request is an API call. In the example shown, to obtain the DEK 251, the trusted execution environment 145 forwards the decrypt request 375 to a key management service 250. In some implementations, the key management service 250 is configured to either grant access to the key 251 (and thereby grant the workload 124 access to the requested private resources 50) or deny access to the key 251 (and thereby prevent the workload 124 from accessing the requested private resources 50). More specifically, the key management service 250 is configured to grant access to the private resources 50 (e.g., by providing access to the corresponding key 251) when the federated identity token 360 satisfies a security policy 252 associated with the private resources 50 and the corresponding client-side cryptographic key 251. For instance, the security policy 252 may define a list of approved credentials for accessing the DEK 251 associated with the private resources 50. Here, the security policy 252 may be satisfied when the federated identity token 360 of the decrypt request 375 matches the security policy 252.

As described above, the key management service 250 provides the DEK 251 to the trusted execution environment 145 when the key management service 250 grants access to the private resources 50 (i.e., when the federated identity token 360 satisfies the security policy 252). In turn, the trusted execution environment 145 may use the cryptographic key 251 to decrypt the encrypted resources 51 (e.g., obtained from the cloud database 150) to access the private resources 50 and execute the workload 124 using the decrypted private resources 50. In some implementations, the DEK 251 is wrapped after the private resources 50 are encrypted. In these implementations, KMS 250 unwraps the DEK 251 and transmits the unwrapped DEK 251 to the environment 145. On the other hand, when the key management service 250 denies access to the private resources 50 (e.g., denies access to the DEK 251), the trusted execution environment 145 may provide an access denied response to the requestor device 120 to inform the requesting entity 20 that access to the private resources 50 for the workload 124 is denied.

In some examples, the key management service 250 resides on the client device 110 and communicates with the trusted execution environment 140 via the network 130. The KMS 250, the attestation service 305, and/or the access policy verifier 350 may execute on the client device 110 or on any other third party system/service in communication with the client device 110 and the cloud environment 140. Further, the example system 100 of FIG. 1 is not intended to be limiting, and any number of devices 110, 120 and modules 145, 305, 350, 250 can be a part of the system 100. For example, multiple entities can access the cloud environment 140 to store respective private resources 50 in the cloud database 150 and/or execute a respective workload 124 (using the trusted execution environment 145). Further, one or more components of the system can be modified, combined, or left out in various implementations. For example, the access policy verifier 350 can be removed in implementations where the KMS 250 can verify the attestation claims of the identity token 330.

Figure 2:
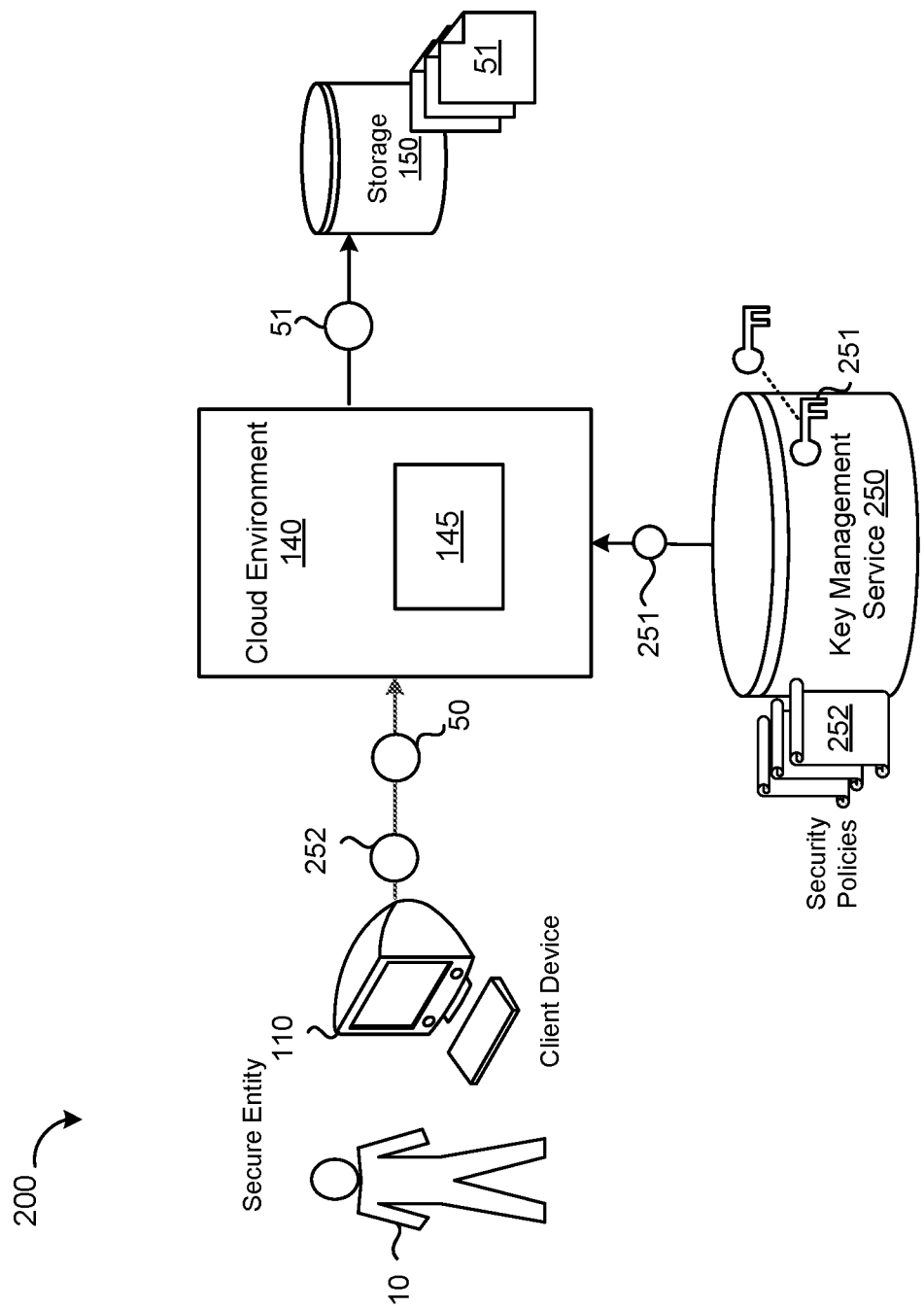
FIG. 2 is a schematic view of example resources generation for cloud-based resources sharing in an untrusted multi-party compute system.

FIG. 2 is a schematic view 200 of example resource generation for cloud-based resource sharing in an untrusted multi-party compute system. In the example of FIG. 2, a secure entity 10 transmits, via a client device 110, the private resources 50, and/or security policies 252 to a cloud environment 140. Here, the secure entity 10 trusts the cloud environment 140 to store and manage access to the private resources 50. The cloud environment 140 may implement a trusted execution environment (TEE) 145 to encrypt the private resources 50 using the DEK 251. In some implementations, the secure entity 10 encrypts the private resources 50 locally and then transmits the private resources 50 (as encrypted resources 51) along with the DEK 251. The trusted execution environment 145 may then transmit the encrypted resources 51 to a cloud database 150 for storage. In some implementations the cloud database 150 is local to the cloud environment 140.

A key management service (KMS) 250 may manage the DEKs 251 as well as an associated security policy associated with the DEKs 251 and the respective encrypted resources 51. For example, the KMS 250 may wrap a respective DEK 251 after the trusted execution environment 145 uses the respective DEK 251 to encrypt private resources 50, thereby securing the respective DEK 251. The KMS 250 may be a third party service external to both the secure entity 10 and the TEE 145 to provide an extra layer of security to the encrypted resources 51. For example, when the cloud database 150 is local to the cloud environment 140, the KMS 250 does not reside on the cloud environment 140. Thus, if the cloud environment 140 is breached by a hostile entity, the encrypted resources 51 remains safe as the hostile entity will not be able access the KMS 250 to retrieve the DEK 251 to decrypt the encrypted resources 51. Here, if the KMS was stored locally at the cloud environment 140, a security breach of the cloud environment 140 could possibly expose the encrypted resources 51.

The private resources 50 can correspond to any sensitive resources or resources that are private to the secure entity 10. For instance, the private resources 50 may include resources governed by privacy laws, such as the Health Insurance Portability and Accountability Act (HIPAA), or General Data Protection Regulation (GDPR). The private resources 50 may contain trade secrets or other resources that could materially damage the secure entity's 10 business or reputation if made public. The private resources 50, whether sensitive or not, may be stored as the encrypted resources 51, at the cloud database 150, and requiring the DEK 251 to decrypt the private resources 50 in plaintext.

Figure 3:
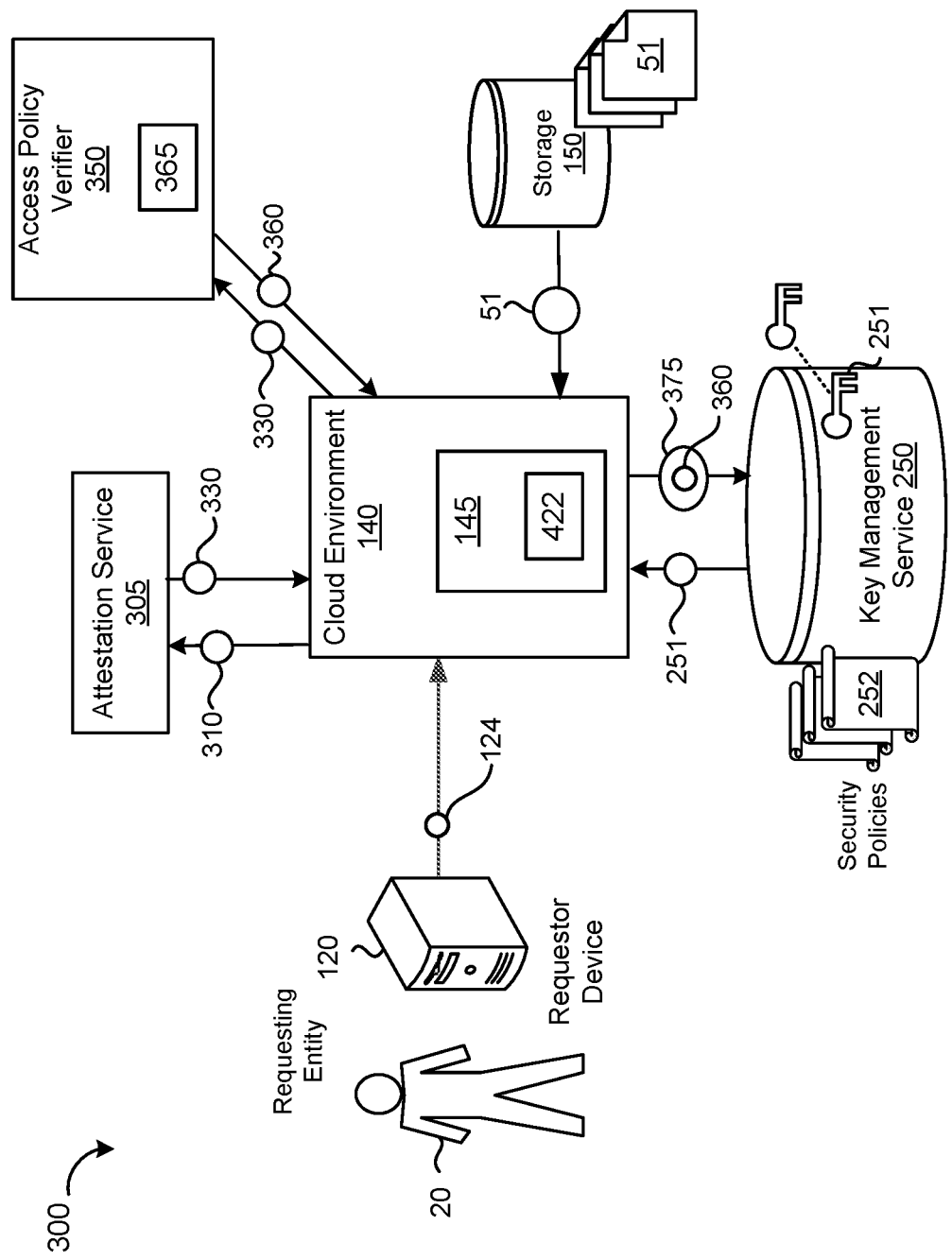
FIG. 3 is a schematic view of example resources consumption for cloud-based resources sharing in an untrusted multi-party compute system.

FIG. 3 is a schematic view 300 of example resource consumption for cloud-based resource sharing in an untrusted multi-party compute system. In the example of FIG. 3, a requesting entity 20, via requestor device 120, transmits a workload 124 to be executed by a trusted execution environment (TEE) 145 (via a container 122) in a cloud environment 140. The workload 124 may require/desire access to the private resources 50 (not shown), stored as encrypted resources 51. The trusted execution environment 145 is configured to authorize the workload 124 and the container 122 (i.e., the environment that the workload 124 executes within) before allowing the workload 124 to access the encrypted resources 51. When the trusted execution environment 145 determines that the workload 124 is not authorized, the trusted execution environment 145 may deny the workload 124 access to the private resources 50.

The trusted execution environment 145 may launch the container 122 such that only a single container 122 is executed by the trusted execution environment 145 at a time. In some implementations, once the trusted execution environment 145 launches the container 122, the requesting entity 20 can no longer influence the execution of the container 122 and/or workload 124. In some implementations, the trusted execution environment 145 is configured to disable features of the container 122 prior to launching the container 122. For example, if a feature of the container 122 allows the requesting entity 20 to further change the container 122, then the trusted execution environment 145 disables the feature. Further, if the trusted execution environment 145 detects a feature of the container 122 that is known to be not be authorized (e.g., by the secure entity 10), the trusted execution environment 145 may disable the feature. In another example, if the trusted execution environment 145 detects a feature of the container 122 that can potentially leak the private resources 50 (i.e., expose the private resources 50 to unauthorized entities), the trusted execution environment 145 disables the feature. The features of the container 122 can include any known features such as container data, container packages, container binaries, etc.

In some examples, the trusted execution environment 145 obtains a launcher image 422. The launcher image 422 may be a hardened launcher image 422 having heightened security. For example, the hardened launcher image 422 is a launcher image 422 that does not include packages, data, and binaries of the container 122 that are not necessary for running a minimal container 122.

The trusted execution environment 145 may generate, based on the launcher image 422, one or more verifiable attestations 310 indicating an integrity of the workload 124 and the container 122. The verifiable attestations 310 securely attest to the state of the secure environment (i.e., the state of the workload 124 and/or the container 122). The verifiable attestations 310 include information about the launcher image 422 that can be used to confirm the container 122 and/or workload 124 are authorized to access the encrypted resources 51 and are in a trusted environment (i.e., the container 122 is immutable and is not exposed to security flaws). For example, the verifiable attestations 310 can include the software and/or configuration of the launcher image 422. The verifiable attestations 310 may attest that the workload 124 and/or the container 122 are unchanged (i.e., have no differences from) approved or authorized containers 122 and workloads 124 (e.g., by verifying signatures, checksums, cyclic redundancy checks, etc.).

The trusted execution environment 145 may transmit the verifiable attestations 310 to an attestation service 305. The attestation service 305 may be configured to verify the verifiable attestations 310. For example, the attestation service 305 can check a public key of the verifiable attestation 310, a signature of the public key of the verifiable attestation 310, an event log of the verifiable attestation 310, security-relevant events for the event log that the verifiable attestation 310 complies with a policy, etc. If the attestation service 305 verifies the verifiable attestation 310, the attestation service returns an identity token 330. The identity token 330 may include attestation claims derived from the attestation. The attestation claims of the identity token 330 may indicate one or more features of the workload 124 and/or the container 122 such as specific functions of the workload 124, a user associated with the container 122, a type of container 122, a version of the container 122, etc. The attestation service 305 may transmit the identity token 330 to the TEE 145.

After receiving the identity token 330, the trusted execution environment 145 may transmit the identity token 330 to an access policy verifier 350. The access policy verifier 350 may include one or more attribute conditions 365. The attribute conditions 365 may be API attribute expressions such as launcher image digest, VM confidentiality, and information on the launcher image 422. The attribute conditions may also be based on validated workload images 432 (see FIG. 4). In some implementations, the access policy verifier 350 determines if the identity token 330 satisfies the attribute conditions 365. When the access policy verifier 350 determines that the identity token 330 satisfies the attribute conditions 365, the access policy verifier 350 returns a federated identity token 360. When the access policy verifier 350 determines that the identity token 330 does not satisfy the attribute conditions 365, the access policy verifier 350 may not return the federated identity token and, thus, the trusted execution environment 145 would determine that the workload 124 is not authorized to access the private resources 50 (stored as encrypted resources 51).

After receiving the federated identity token 360, the trusted execution environment 145 may generate a decrypt request 375. In some implementations, the decrypt request 375 includes the federated identity token 360. The decrypt request 375 may be an API call or any other communication protocol suitable for requesting resources between applications. The trusted execution environment 145 may transmit the decrypt request to a key management service (KMS) 250. The key management service 250 may be configured to compare the federated identity token 360 to one or more security policies 252. If the KMS 250 determines that the federated identity token 360 satisfies the security policy 252, the KMS 250 transmits a data encryption key (DEK) 251 to the TEE 145. In some implementations, the DEK 251 is a wrapped key and the KMS unwraps the DEK 251 prior to transmitting the DEK 251. When the KMS 250 determines that the federated identity token 360 of the decrypt request 375 does not satisfy the security policy 252, the KMS 250 may not return the DEK 251 and, thus, the trusted execution environment 145 would determine that the workload 124 is not authorized to access the private resources 50 (stored as encrypted resources 51). The security policy 252 may be configured by an entity associated with the encrypted resources 51 (e.g., secure entity 10). In some implementations, the security policy 252 is based on an IAM policy.

As illustrated in the example of FIG. 3, access to the private resources 50 is authorized by the key management service 250. The KMS 250 may be managed by the secure entity 10 and may reside on the premises of the secure entity 10 or reside external to the secure entity 10. In some implementations, the KMS 250 provides DEKs 251 (e.g., cryptographic keys) in response to the decrypt request 275 from the trusted execution environment 145. As the private resources 50 stored on the cloud database 150 are encrypted, and thus inaccessible without the DEK 251, the secure entity 10 may exclusively control how DEKs 251 required for accessing the private resources 50 are accessed from the KMS 250. The KMS 250 may reside on the secure entity 10 or at some other location isolated/independent from the cloud database 150 managed by the cloud environment 140 and including the encrypted resources 51. Here, the KMS 250 may manage client-side DEKs 251 that include customer-managed encryption keys (CMEKs).

After receiving the DEK 251, the trusted execution environment 145 may obtain the encrypted resources 51 from the cloud database 150. The trusted execution environment 145 may then use the DEK 251 to decrypt the encrypted resources 51 to access the private resources 50. In some implementations, the workload 124 executing in the TEE 145 decrypts the encrypted resources 51 using the DEK 251. In some implementations, the trusted execution environment 145 executes the workload 124 using the private resources 50. After executing the workload 124, the trusted execution environment 145 may transmit the results to the requesting entity 20. In this manner, the requesting entity 20 is able to execute a workload 124 using the private resources 50 without ever having access to the private resources 50.

Figure 4:
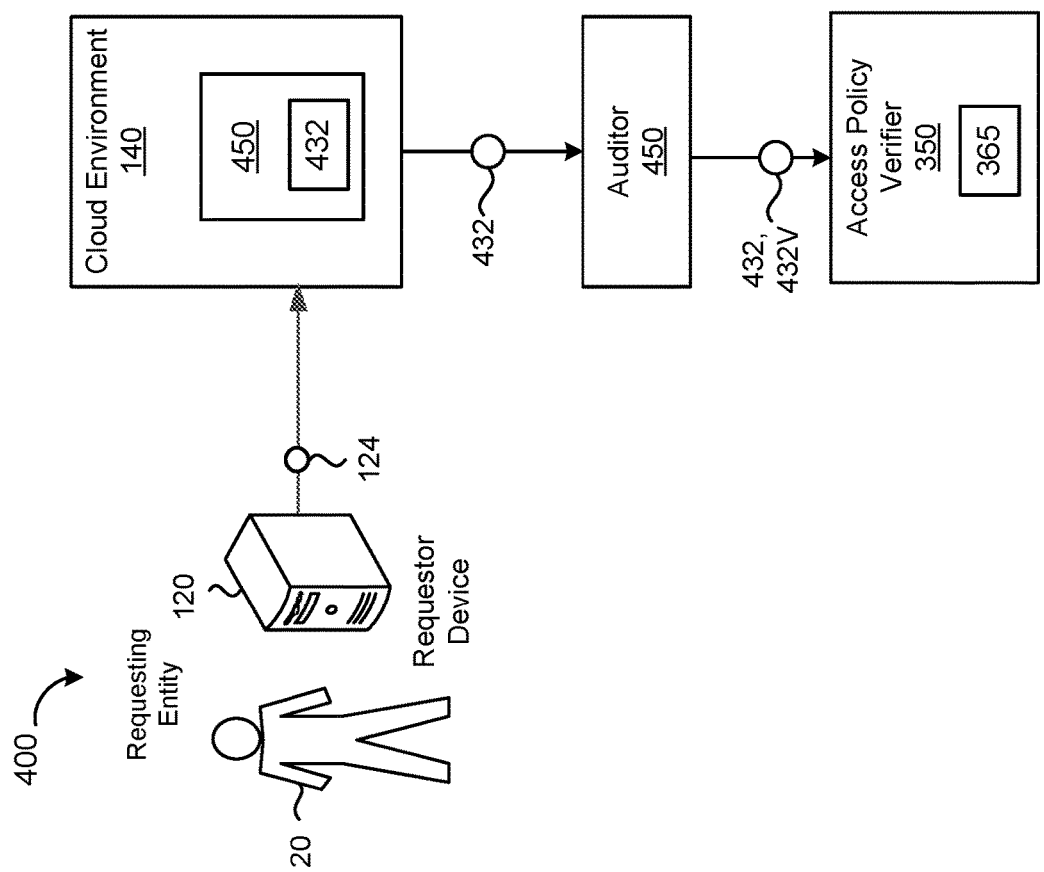
FIG. 4 is a schematic view of example workload image deployment for cloud-based resources sharing in an untrusted multi-party compute system.

FIG. 4 is a schematic view 400 of example workload image deployment for cloud-based resource sharing in an untrusted multi-party compute system. In the example of FIG. 4, a requesting entity 20 may transmit, via a requesting device 120, a workload 124 to a cloud environment 140. The cloud environment 140 may implement an auditor 450 to obtain a workload image 432 representing a workload 124. The workload image 432 may indicate a code of the workload 124 and the auditor 450 may validate the workload image 432. In some implementations, the auditor 450 is an independent third party used to validate the workload image 432 for the untrusted multi-party compute system. The auditor 450 validates the workload image 432 when the workload image 432 does not include any features that render the associated container 122 and/or workload 124 as unauthorized to access private resources 50. The auditor may check features related to the workload 124 and/or container 122 such as a user associated with the container 122, one or more functions of the workload 124, etc. If the auditor 450 validates the workload image 432, the auditor 450 publishes the validated workload image 422, 422V to an access policy verifier 350. The access policy verifier 350 may then encode values of the validated workload image 432V into attribute conditions 365 of the access policy verifier 350. In some implementations, the auditor 450 publishes the validated workload image 432V to one or more entities (e.g., secure entity 10 and/or requesting entity 20) such that the entities can further configure the attribute conditions 365 of the access policy verifier 350 and/or further configure future containers 122 and/or workload 124.

Figure 5:
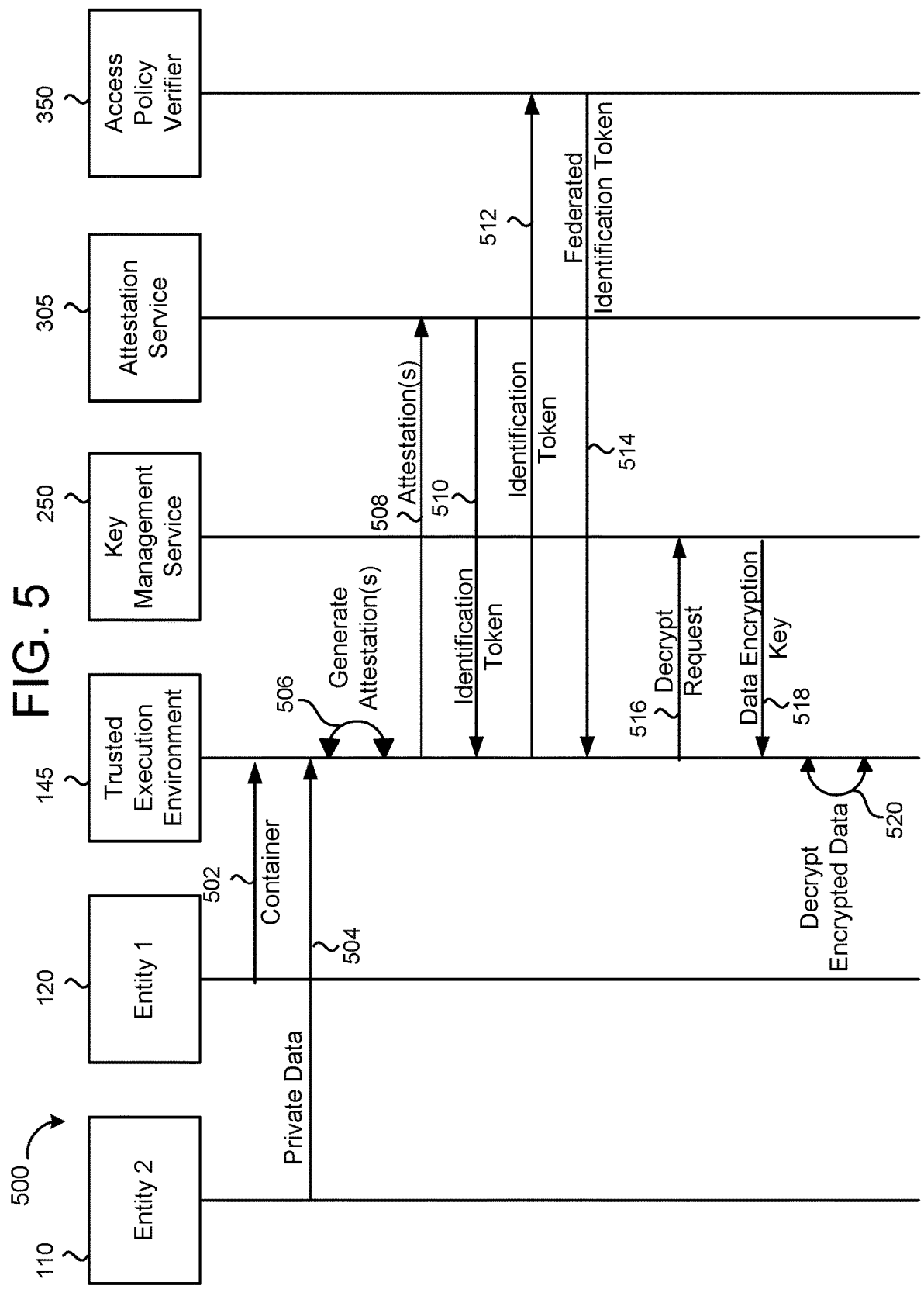
FIG. 5 is a sequence diagram for cloud-based resources sharing in an untrusted multi-party compute system.

FIG. 5 is a sequence diagram 500 for cloud-based resource sharing in an untrusted multi-party compute system. At step 502, a first entity 120 (e.g., requesting entity 120 of FIG. 1) transmits container parameters to a trusted execution environment (TEE) 145 defining a container 122. The container 122 may execute a workload 124. At step 504, a second entity 110 (e.g., secure entity 110 of FIG. 1) transmits private resources 50 to the trusted execution environment 145. The private resources 50 may include resources that are sensitive and/or private to the second entity 110. In some implementations the trusted execution environment 145 encrypts private resources 50 using a data encryption key (DEK) 251 and stores the private resources 50 as encrypted resources 51 at a cloud database 150. At step 506, the trusted execution environment 145 generates one or more verifiable attestations 310 indicating an integrity of the workload 124 and/or the container 122. The verifiable attestations 310 may be based on a launcher image 422. In some implementations, the launcher image 422 is a hardened launcher image 422 indicating that the launcher image 422 is immutable and/or invulnerable. In some implementations, the trusted execution environment 145 only executes a single instance of a container 122 to improve security. The trusted execution environment 145 may also launch the container 122 such that it is no longer accessible by any entity. At step 508, the trusted execution environment 145 transmits the verifiable attestations 310 to an attestation service 305. At step 510, the attestation service 310 returns an identification token 330 indicating one or more attestation claims associated with the container 122 and/or workload 124 based on the attestation claims 310. At step 512 the trusted execution environment 145 transmits the identification token 330 to an access policy verifier 350. The access policy verifier 350 may determine if the identification token 330 satisfies an attribute condition 365. The attribute condition 365 may be configured by either an entity associated with the private resources 50 (e.g., secure entity 10) or an auditor 450 based on one or more validated workload images 432V. At step 514, the access policy verifier 350 transmits a federated identification token 360 to the trusted execution environment 145. At step 516, the trusted execution environment 145 transmits a decrypt request 375 including the federated identification token 360 to a key management service (KMS) 250. The KMS 250 may then determine if the decrypt request 375 satisfies a security policy 252. The security policy 252 may be associated with the private resources 50 and may be configured by the entity associated with the private resources (e.g., secure entity 110). At step 518, the KMS 250 transmits the data encryption key 251 to the trusted execution environment 145 indicating that the decrypt request 375 satisfies the security policy 252. At step 520, the trusted execution environment 145 decrypts the encrypted resources 51 using the DEK 251 to access the private resources 50. In some implementations, the trusted execution environment 145 executes the workload 124 using the private resources 50.

Figure 6:
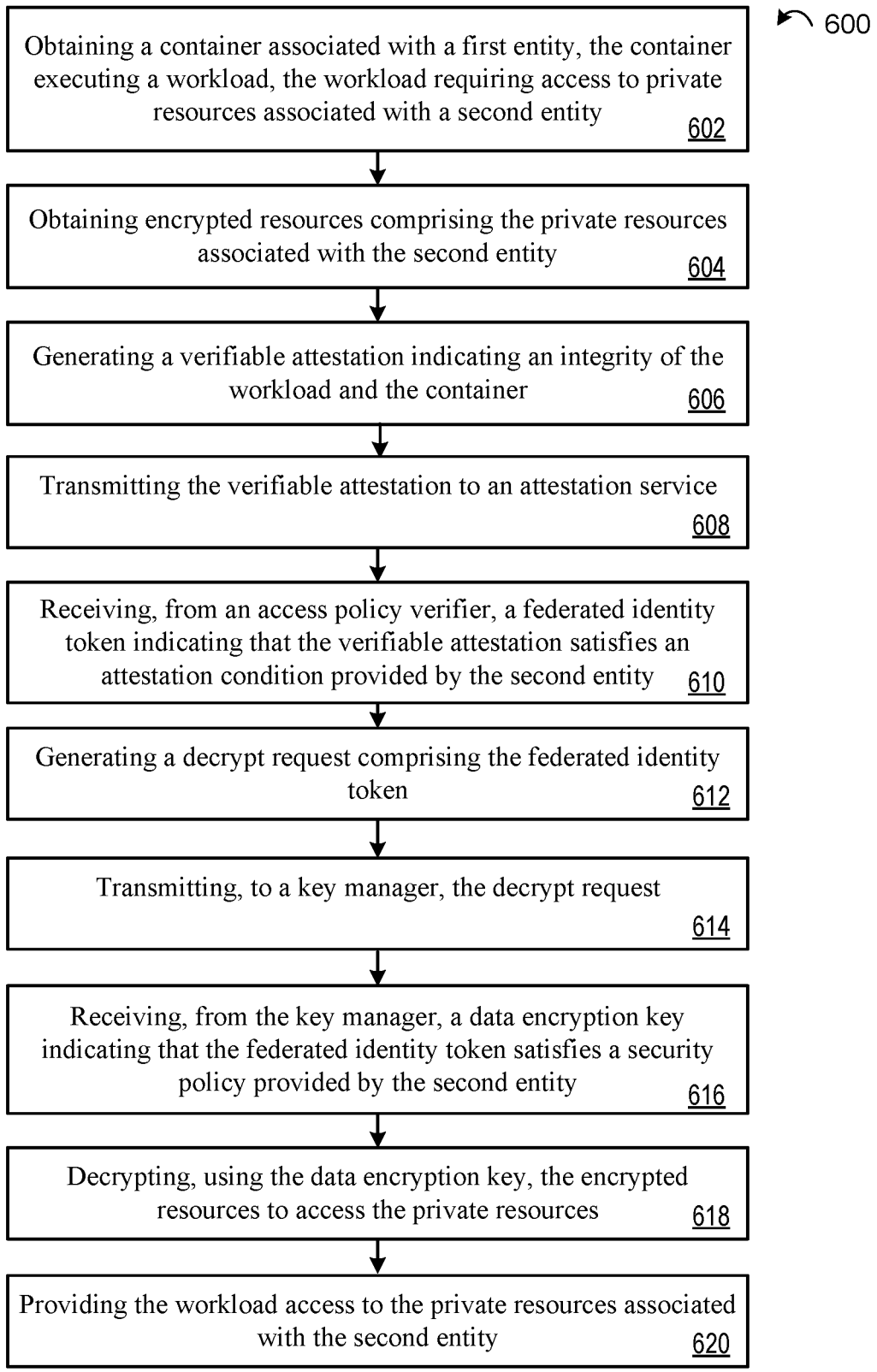
FIG. 6 a flowchart of an example arrangement of operations for a method of cloud-based resources sharing in an untrusted multi-party compute system.

FIG. 6 is a flowchart of an exemplary arrangement of operations for a method 600 of cloud-based resources sharing in an untrusted multi-party compute system. At operation 602, the method 600 obtains a container 122 associated with a first entity 20, the container 122 executing a workload 124, the workload 124 requiring access to the private resources 50 associated with a second entity 10. At operation 604, the method 600 obtains encrypted resources 51 including the private resources 50 associated with the second entity 10. At operation 606, the method 600 generates a verifiable attestation 310 indicating an integrity of the workload 124 and the container 122. At operation 608, the method 600 transmits the verifiable attestation 310 to an attestation service 305. At operation 610, the method 600, after transmitting the verifiable attestation 310, receives, from an access policy verifier 350, a federated identity token 360 indicating that the verifiable attestation 310 satisfies an attribute condition 365 provided by the second entity 10. At operation 612, the method 600 generates a decrypt request 375 including the federated identity token 360. At operation 614, the method 600 transmits, to a key management service 250, the decrypt request 375. At operation 616, the method 600 after transmitting the decrypt request 375, receives, from the key management service 250, a data encryption key 251 indicating that the federated identity token 360 satisfies a security policy 252 provided by the second entity 10. At operation 618, the method 600 decrypts, using the data encryption key 251, the encrypted resources 51 to access the private resources 50. At operation 620, the method 600 provides the workload 124 access to the private resources 50 associated with the second entity 10.

Figure 7:
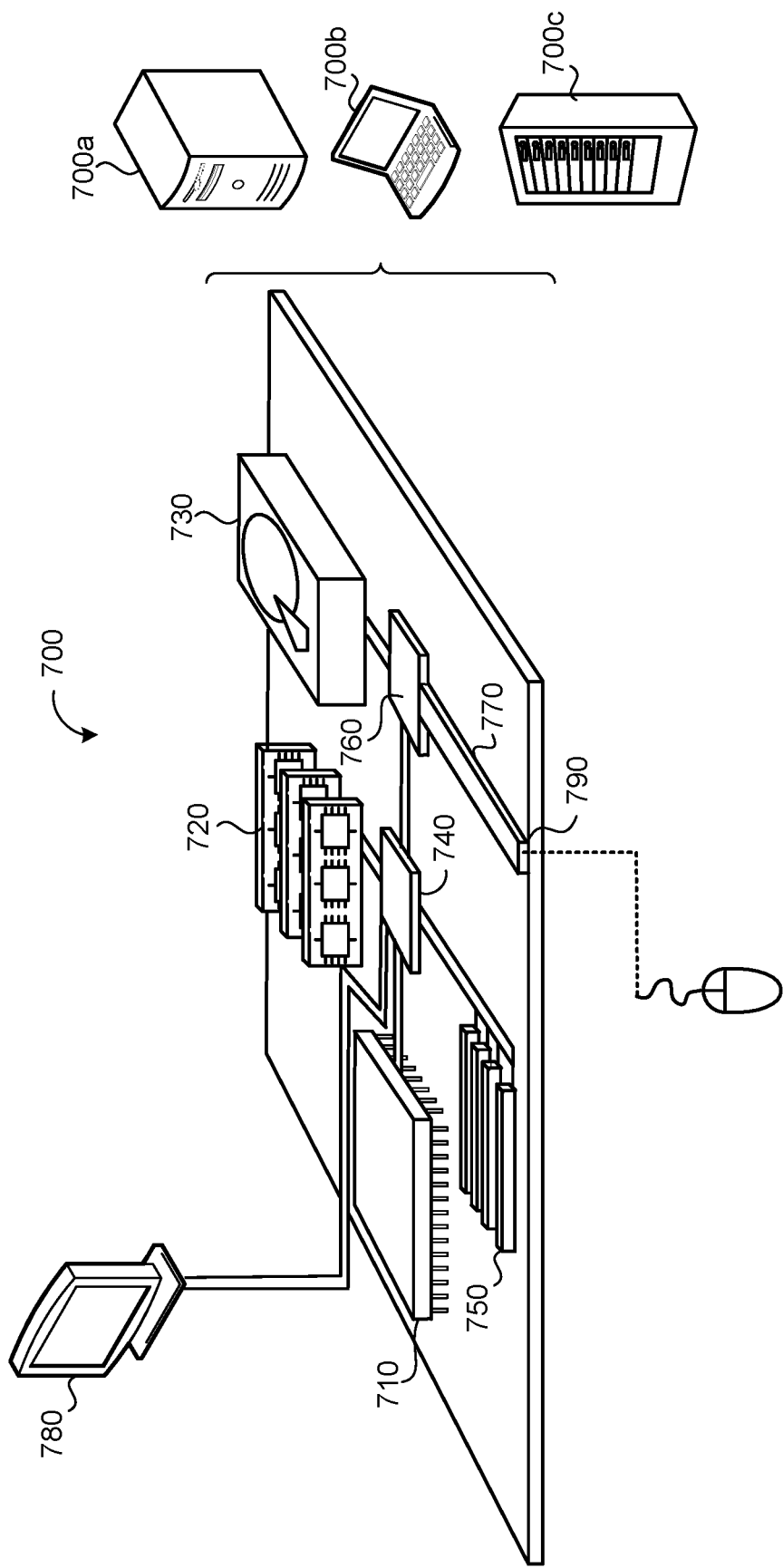
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a trusted execution environment (TEE) that causes the data processing hardware to perform operations comprising:
    obtaining a container associated with a first entity, the container executing a workload, the workload requiring access to private resources associated with a second entity;
    obtaining encrypted resources comprising the private resources associated with the second entity;
    generating a verifiable attestation indicating an integrity of the workload and the container;
    transmitting the verifiable attestation to an attestation service;
    after transmitting the verifiable attestation, receiving, from an access policy verifier, a federated identity token indicating that the verifiable attestation satisfies an attribute condition provided by the second entity;
    generating a decrypt request comprising the federated identity token;
    transmitting, to a key management service, the decrypt request;
    after transmitting the decrypt request, receiving, from the key management service, a data encryption key indicating that the federated identity token satisfies a security policy provided by the second entity;
    decrypting, using the data encryption key, the encrypted resources to access the private resources; and
    providing the workload access to the private resources associated with the second entity.

2. The method of claim 1, wherein obtaining the encrypted resources comprises receiving the encrypted resources from a cloud database.

3. The method of claim 1, wherein the operations further comprise:
    after transmitting the verifiable attestation, receiving, from the attestation service, an identification token generated based on the verifiable attestation;
    transmitting, to the access policy verifier, the identification token; and
    after transmitting the identification token, receiving, from the access policy verifier, the federated identity token.

4. The method of claim 1, wherein the transmitting the decrypt request causes the key management service to:
    determine, based on the federated identity token satisfying the security policy provided by the second entity, that the workload is allowed to access the private resources associated with the second entity;
    unwrap the data encryption key; and
    transmit the unwrapped data encryption key.

5. The method of claim 1, wherein the operations further comprise:
generating a workload image corresponding to the workload; and
transmitting, to an auditor, the workload image, wherein receiving the container image causes the auditor to:
validate the workload image; and
publish the validated workload image to the access policy verifier.

6. The method of claim 1, wherein the operations further comprise disabling features of the container based on preferences of the second party.

7. The method of claim 6, wherein the features comprise one or more of:
container data;
container packages; and
container binaries.

8. The method of claim 1, wherein the verifiable attestation is based on a hardened launcher image corresponding to the container.

9. The method of claim 1, wherein the operations further comprise executing the workload using the private resources associated with the second entity.

10. The method of claim 1, wherein the decrypt request is an API call.

11. A system comprising:
data processing hardware of a trusted execution environment (TEE); and
memory hardware in communication with the data processing hardware, the memory hardware storing instructions that when executed on the data processing hardware cause the data processing hardware to perform operations comprising:
obtaining a container associated with a first entity, the container executing a workload, the workload requiring access to private resources associated with a second entity;
obtaining encrypted resources comprising the private resources associated with the second entity;
generating a verifiable attestation indicating an integrity of the workload and the container;
transmitting the verifiable attestation to an attestation service;
after transmitting the verifiable attestation, receiving, from an access policy verifier, a federated identity token indicating that the verifiable attestation satisfies an attribute condition provided by the second entity;
generating a decrypt request comprising the federated identity token;
transmitting, to a key management service, the decrypt request;
after transmitting the decrypt request, receiving, from the key management service, a data encryption key indicating that the federated identity token satisfies a security policy provided by the second entity;
decrypting, using the data encryption key, the encrypted resources to access the private resources; and
providing the workload access to the private resources associated with the second entity.

12. The system of claim 11, wherein obtaining the encrypted resources comprises receiving the encrypted resources from a cloud database.

13. The system of claim 11, wherein the operations further comprise:
after transmitting the verifiable attestation, receiving, from the attestation service, an identification token generated based on the verifiable attestation;
transmitting, to the access policy verifier, the identification token; and
after transmitting the identification token, receiving, from the access policy verifier, the federated identity token.

14. The system of claim 11, wherein the transmitting the decrypt request causes the key management service to:
determine, based on the federated identity token satisfying the security policy provided by the second entity, that the workload is allowed to access the private resources associated with the second entity;
unwrap the data encryption key; and
transmit the unwrapped data encryption key.

15. The system of claim 11, wherein the operations further comprise:
generating a workload image corresponding to the workload; and
transmitting, to an auditor, the workload image, wherein receiving the workload image causes the auditor to:
validate the workload image; and
publish the validated workload image to the first entity and the second entity.

16. The system of claim 11, wherein the operations further comprise disabling features of the container based on preferences of the second party.

17. The system of claim 16, wherein the features comprise one or more of:
container data;
container packages; and
container binaries.

18. The system of claim 11, wherein the verifiable attestation is based on a hardened launcher image corresponding to the container.

19. The system of claim 11, wherein the operations further comprise executing the workload using the private resources associated with the second entity.

20. The system of claim 11, wherein the decrypt request is an API call.

* * * * *